(12) United States Patent
Neubauer (10) Patent No.: US 9,316,486 B2
(45) Date of Patent: Apr. 19, 2016

(54) METHOD AND APPARATUS FOR DETERMINING AND STORING THE POSITION AND ORIENTATION OF ANTENNA STRUCTURES

(76) Inventor: Thomas Neubauer, Vienna (AT)

( * ) Notice: Subject to any disclaimer, the term of this patent is extended or adjusted under 35 U.S.C. 154(b) by 91 days.

(21) Appl. No.: 14/129,272

(22) PCT Filed: Jun. 13, 2012

(86) PCT No.: PCT/AT2012/000167
§ 371 (c)(1),
(2), (4) Date: Mar. 6, 2014

(87) PCT Pub. No.: WO2013/003872
PCT Pub. Date: Jan. 10, 2013

(65) Prior Publication Data
US 2014/0205205 A1  Jul. 24, 2014

(30) Foreign Application Priority Data
Jul. 1, 2011  (AT) .................................. A 966/2011

(51) Int. Cl.
*G06K 9/36* (2006.01)
*G01B 11/14* (2006.01)
*H01Q 1/12* (2006.01)
*G06T 7/00* (2006.01)

(52) U.S. Cl.
CPC .............. *G01B 11/14* (2013.01); *G06T 7/0042* (2013.01); *H01Q 1/125* (2013.01)

(58) Field of Classification Search
CPC ....... G01B 11/14; G06T 7/0042; H01Q 1/125
See application file for complete search history.

(56) References Cited

U.S. PATENT DOCUMENTS

| | | | | |
|---|---|---|---|---|
| 5,528,518 A | * | 6/1996 | Bradshaw et al. | ............. 702/150 |
| 7,646,339 B2 | * | 1/2010 | Green et al. | ............. 342/357.34 |
| 8,717,232 B2 | * | 5/2014 | Ashjaee et al. | ........... 342/357.23 |
| 2009/0021447 A1 | | 1/2009 | Austin et al. | .................. 343/880 |
| 2010/0033371 A1 | * | 2/2010 | Kumagai et al. | ......... 342/357.06 |
| 2011/0066375 A1 | * | 3/2011 | France et al. | ................. 701/213 |

FOREIGN PATENT DOCUMENTS

DE  10 2005 040 414  3/2007

* cited by examiner

*Primary Examiner* — Phuoc Tran
(74) *Attorney, Agent, or Firm* — Fattibene and Fattibene LL; Paul A. Fattibene (57) ABSTRACT

Determining the position and orientation of base station antennas in mobile radio is highly important for optimizing the transmission parameters. It requires time-consuming and costly effort, since measurements need to be taken directly at the antenna. Furthermore, it is often impossible to access the antennas. This has a very disadvantageous effect on the precision of the data, which means that the optimizing results suffer greatly from this. The method according to the invention and the presented apparatus allow the position and orientation of the transmission antenna to be found quickly, precisely and inexpensively without needing to take measurements close to the antenna. This involves the absolute position of the antenna being determined by means of automatic determination of the coordinates of the reference point, measurement of distance to the target antenna, measurement of the angle of inclination and measurement of the orientation of the measuring equipment. Photogrammetric measurement methods, knowledge about the absolute dimensions of the antenna, and mathematical methods of conformal coordinate transformation are used to determine the orientation of the base station antenna to be measured from an image taken from the point of measurement.

11 Claims, 3 Drawing Sheets

METHOD AND APPARATUS FOR DETERMINING AND STORING THE POSITION AND ORIENTATION OF ANTENNA STRUCTURES

FIELD OF THE INVENTION

The present invention relates to a method and apparatus for determining the position and orientation of antenna structures.

BACKGROUND OF THE INVENTION

A mobile communications system typically includes one or more base stations that may be connected by other network elements such as switches, or gateways. Each of these base stations provides radio coverage to a particular area, a so-called cell. Terminals within a particular cell coverage area establish a connection with the mobile communications system to one or more antennas of one or more base stations. The antennas are usually mounted on as high as possible structures, for example on roofs of houses and buildings, towers or masts.

The orientation of antennas and antenna structures can have a significant impact on the coverage, quality, capacity, and the maximum data rate of a wireless system. The influence of the antenna orientation onto the radio coverage is described for example in Esmael Dinan et al, "UMTS Radio Interface System Planning and Optimization", Bechtel Telecommunications Technical Journal, December 2002, Vol 1, No 1, pp 1-10 or in Jaana Laiho, "Radio Network Planning and Optimization for UMTS", Second Edition, John Wiley and Sons, 2006, Chapter 9 (Advanced Analysis Methods and radio access network auto-tuning), pp 505-569.

The optimization of the antenna orientation in radio systems provides a number of advantages, such as improving coverage, reducing the interfering emission (interference), an increase in range and/or an increase in the capacity of a cellular system.

To perform an appropriate optimization of antenna orientations, both in transmission and in reception case, it is necessary to determine the appropriate parameters (eg, received signal power, interference, data rate, bit error rate) at the receiver. In general, different ways of measuring these parameters exist, for example drive tests, reference receiver measurements, measurements at terminals—e.g. for each event, such as call set-up, handover, changing the strongest serving cell, etc. The measurements can be done during an active or passive connection, according to the respective standardized procedure. Today mostly standardized systems such as Global System for Mobile Communication (GSM), Universal Mobile Telecommunications System (UMTS) or Long Term Evolution (LTE) can be used for mobile radio transmission. However, the optimization of the antenna orientation is a problem that can occur with any and all mobile communication systems, no matter if standardized or proprietary.

The radio link, in which the antenna structure transmits to the receiving device, the user, is called downlink (or forward link). The reverse direction in which the antenna structure is on the receiving end and the signals are sent by the user (the mobile), in turn, called uplink (or reverse link).

In the downlink the path loss of the wireless channel can be determined by means of the respective measurement points (for example, using GPS localization during drive tests), and the position, orientation, and transmit power to the transmit antenna.

The received power derives from the transmitted power in the direction of the measurement point. Thus, it is highly dependent on the orientation of the antenna. The path loss (propagation characteristics of the mobile radio channel) is independent of the transmit power and can therefore be determined with knowledge of the transmit power, antenna orientation and structure (antenna gain), and the measured received power.

Based on the determined path loss, an improvement in the orientation of the antenna structure can be made that aims for an improvement of the signal coverage, the reduction of noise (interference), and increase of the range, capacity or data rate, etc.

The transmit power is known and relatively easy to access in the system databases. The type of antenna is typically known as all antenna manufacturers provide appropriate antenna diagrams. Similarly, the received values are known from the measurements. It is therefore of utmost importance for the optimization of antenna parameters that the original data for the position and orientation in the underlying system database correspond to the actual values.

External factors, in particular by wind and weather, improper installation, or the like, can, for example, always result in unwanted displacements of the antenna during operation.

The optimization of antenna parameters is carried out both during the construction of a mobile network, during the network expansion, i.e. during the addition of new transmission facilities both the orientation of the newly added antenna and the orientations of neighboring transmitters are to be optimized continuously, to maximize the signal coverage during operation, and to minimize interference due to the ever-increasing traffic.

To detect the position and orientation of antenna structures and for storage in databases various options are available according to the state-of-the-art.

A common method for sensing the position and orientation of antenna structures is the on-site measurement of the position using GPS system (x, y, z), the determination of azimuth alignment using compass, and the determination of antenna tilt with tilt angle encoders.

However, these methods have a number of practical disadvantages, such as:
  Access restrictions on transmission facilities in operation: Without turning the active transmitter off, no measurements in the immediate vicinity of the antennas can be performed. Furthermore, access to these objects may be restricted, or very limited, e.g. power poles, homes, transmitters that are shared with other operators—which would mean a shutdown of all networks, etc. A subsequent measurement is therefore expensive and takes a long time.
  High costs: Even if access is permitted, the accurate measurement requires usually expensive and thus qualified staff, eg safeguards to climb a pole, etc.
  Errors due to the manual reading process: With the manual reading of measurement data errors are possible
  Disturbances of the magnetic field in the immediate vicinity of the metallic masts: In the near field of an electromagnetic transmitter a compass therefore does not always point to the north. As a result, both systematic and random measurement errors arise.
  Wrong entry of data into the database: the data are almost exclusively manually entered into a database. Thus, even when the data is measured and read correctly, the manual input is another major error source.

SUMMARY OF THE INVENTION

The objective of the invention is to provide a method and a device that enables the determination of the position and orientation of an antenna structure in an efficient manner.

According to the invention this is achieved by calculating the orientation of antenna characteristics based on a recorded digital image of the antenna, and other data that can be measured from a measurement location remote from the antenna.

This alignment measurement is possible without direct access to the antenna.

According to the invention a method for determining alignment of an antenna is provided which comprises the steps of: taking a digital image of an antenna with a camera at a measuring location, determining the relative position of the measurement location with respect to the antenna, determining the size of the antenna, and calculating the orientation of the antenna based on features of the captured digital image, the determination of the relative position and size of the antenna.

According to the invention a device for determining alignment of an antenna is provided with a position calculating device for determining alignment of an antenna based on characteristics of a picture, i.e. a digital image of the antenna taken by a camera, taken in a measuring location, the relative position of the measurement location with respect to the antenna and the size of the antenna itself.

Determining the relative position preferably comprises a determination of the position of the measuring location, and a measurement of the distance between the measuring point and/or a measurement of the direction in which the distance was measured. The measurement location is the location (measuring point, measuring position) at which the relative position measurement and the image of the antenna are taken.

Determining the relative position can, for example, include a device for distance measurement with a display for displaying the target object so that the antenna will be shown on the display, whereas the orientation towards the target object is executed by a user in the measuring location. The determination may further comprise measuring the position of the device and the distance between the device and the antenna. The device may for example be a laser-based distance measuring device.

A part of the procedure and/or a function of the device according to one of the embodiments may comprise flagging predetermined or predefined locations on the antenna by the user on the display, or in the digital image taken, wherein calculating the alignment of the antenna based on the marked positions and the measured distance and orientation of the device takes place. The predefined points may be, for example the corners of a square-shaped antenna, and/or a plurality of points on the edges of the antenna outline. The user can select them by means of a cursor. Alternatively, the user may be displayed a frame of adjustable size on the display device. The user can then customize the shape and size of the frame and surround the antenna by the frame.

The characteristics of the digital image can be predefined/predetermined locations recorded in the image of the antenna (and/or its relative position to each other) and the calculation of the alignment of the antenna can be carried out with a coordinate transformation.

Determining the size of the antenna conveniently comprises extraction of the technical specifications of the antenna from a database based on the image of the antenna and/or the position of the antenna and/or a user input.

The calculated direction of the antenna and/or the captured image can be stored in a database. This may be part of the inventive device, or may be connected to the device (through a cable or a radio connection).

The position of the measurement location can be determined by a GPS receiver or other methods. For example, the position can be manually marked on a map and thus reference point positions can be entered, or a measuring point with known coordinates can be chosen. The GPS receiver may be a part of the inventive device, or the device may comprise a port for connection of the GPS receiver.

The present invention may be implemented by means of a program running on a computer. The program carries out the calculation of the orientation of the antenna. The recording of the image, the position measurement, and/or the distance measurement may be performed by external devices, and the data obtained can be provided to the program. The size (dimensions) of the antenna can be made available to the program from an external database.

However, the above measuring devices can be connected in accordance with the invention to the computer, and thus jointly provide a measurement system.

According to the invention, the device however can also comprise some of the above components and be connected with each other.

According to a further embodiment a computer program is provided that implements the features of the method according to the invention. The program may be stored on a storage medium, for example on an optical disk (CD, DVD, BD, etc.) on a hard disk on a USB stick, or similar.

Further details, advantages and features of the invention will become apparent from the following description and the drawings, to which the disclosure with respect to all details not described in the text reference is expressly made.

DETAILED DESCRIPTION OF THE PREFERRED EMBODIMENTS

The invention relates to a method and a device for determining the orientation of the antenna structures so that an optimization of the coverage and thus an improvement in the number of served users, an increase in the data rate and an increase in capacity can be achieved. The position of the antenna can also be determined.

In particular, a method and an apparatus for automatic determination and storage of the position and orientation of the antenna structure is provided so that an optimization of the coverage and thus an improvement of the number of users, in coverage and in the capacity can be achieved. The determination of the position and orientation of the antenna structures can be automatically carried out from street level without cost-intensive prospecting and surveying of the antenna position and orientation on the construction site are required directly, and the storage of the data is automated as well.

By doing so, the absolute position of the reference point (measuring point), the orientation of the measuring device with a view to the antenna structure, the spatial distance between measuring point and antenna, the actual dimensions of the antenna, and measurement points at the antenna for determining the position and the orientation of the antenna structure can be derived.

Based on the measurement points in the antenna structure image, the known dimensions of the antenna, and the distortion of the antenna structure from the view point (reference point) from the orientation of the antenna structure according to the invention is determined.

Both position (x, y, z) and orientation (azimuth, tilt and rotation) of the antenna can be derived according to the inventive method and the inventive device, i.e. both can be calculated on the basis of the invention and stored by automatic electronic data collection and transmission in a database, where the data is available for further use, for example for verification of the measurement result on a digital map, such as Google Earth, etc.

The technique of the invention has several advantages over the conventional techniques. It is independent of the electromagnetic wave propagation conditions, and thus applicable for urban and rural environments. There are no assumptions about the directional pattern of the antenna array, so that no restrictions exist. There are no assumptions on the frequency range in which the invention is applied. There are no assumptions about the access technology on the radio interface, so that there are no restrictions on the frequency, time or code-duplex mode.

There are no assumptions about the resolution, or accuracy of the position and orientation taken so that no restrictions exist. There are no restrictions made concerning the determination of the reference point for the measurements, so no restrictions if these are determined using GPS or similar methods. No assumptions and assumptions exist on how to calibrate the orientation of the reference point in both the horizontal (azimuth) and vertical (tilt angle) plane. There are no assumptions about the way the distance measurement is done, so that no restrictions exist. It can, for example, use various methods, such as optical interferometry, time measurements, etc. There are no restrictions made on which method is used to create an image of the antenna structure. For example, a built-in photo sensor can be used, but also a commercial digital SLR camera, or an inexpensive compact camera. There are no restrictions assumed according the methods of digital image processing, photogrammetry, coordinate transformations, pattern recognition or the like, which can be used to determine the orientation of the antenna structure, based on an image.

There are no assumptions made about the number of measurement points for determining the orientation of the antenna structure. There are no assumptions made about the selection of measurement points for determining the orientation of the antenna structure. There are no assumptions made about the type of database structures to store the position and orientation data. No assumptions are made about the method used to collect and store the data, so that no restrictions exist. No assumptions are made regarding the database, so that no restrictions exist on the nature of the interfaces for the transmission of data. There are no assumptions made about the nature of the geo-referencing of the position data of the antenna structure.

Figure 2:
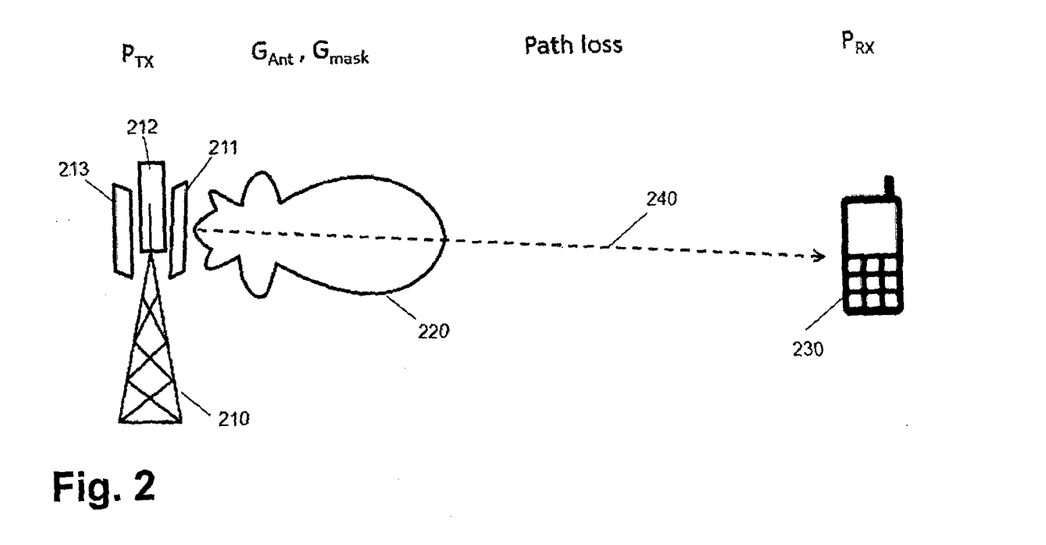
FIG. 2 schematically illustrates a downlink of a radio transmission with a transmission towers, a 3-sector configuration with an antenna orientation with a corresponding antenna directivity pattern, and a receiver, FIG. 3 an example of an apparatus for determining the alignment of the antennas, FIG. 4 schematic representation of an antenna structure mounted on a pole, in which the basis of the distortion of the image points (from the reference points, i.e. the vertices of the antenna structure) can be determined from the orientation, FIG. 5 an example of the logical function blocks in accordance with the described invention.

In FIG. 2, the major components to determine the propagation channel attenuation (pathloss) are shown, where this is calculated as follows:

$$Pathloss_{sector} = P_{TX} - P_{RX} + G_{Ant} - G_{mask\ f\{antenna\ orientation\}}$$

The transmit power $P_{TX}$ of antenna 211 is sent with the antenna gain $G_{Ant}$ in the direction 240 towards the receiver 230. The position and orientation of the antenna 211 relative to the position of the receiver 230, in combination with the antenna radiation pattern 220 results in a directional radiation pattern and an antenna gain $G_{mask\ f\{antenna\ orientation\}}$. The power is measured at the receiver 230 and is, such as the position of the receiver (for example, via GPS, or various other methods according to the state of the art) available (eg, drive test measurements, geo-localized Mobile Measurements, etc.). This allows the computation of the attenuation of the propagation channel that is independent of the antenna and power, which can then be used for a subsequent optimization of the alignment of the transmitting antenna.

Essential for the correct determination of the attenuation are the position and orientation of the transmitting antenna 211. If this is wrong, the results of the optimization can be inferior, or just plain wrong, so that no or only a small improvement can be achieved. For incorrect output values deterioration in the quality and capacity of the cellular network are possible.

Figure 3:
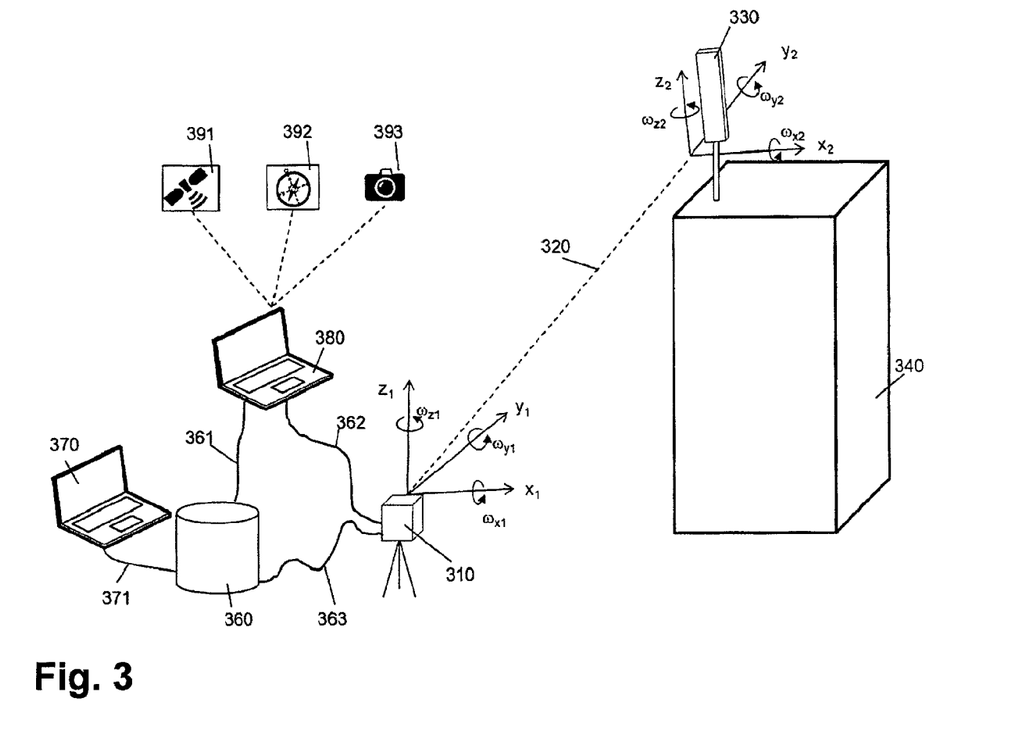

FIG. 3 schematically shows the measurement setup. The measuring apparatus 310 is located at the reference position. This reference position is determined by means of automatic calibration of the position (x1, y1, z1) and the automatically determined orientation (azimuth, inclination and rotation, that is $\omega_{x1}, \omega_{y1}, \omega_{z1}$) during the measurement on target object 330.

The measurement apparatus 310 includes technical means for determining the position ($x_1, y_1, z_1$), the distance measurement 320, for determining the orientation (azimuth, tilt, roll) to the target object ($\omega_{x1}, \omega_{y1}, \omega_{z1}$), and for detecting images of the target object 330

Starting from the reference point the target object, the antenna structure 330, which may be located on a building 340 or a pole, or the like, will be measured. By means of distance measurement 320, the distance to the target object is determined.

Through the position and the alignment, i.e. orientation of the reference point in the direction of the target object ($\omega_{x1}, \omega_{y1}, \omega_{z1}$), as well as the precise distance measurement 320 between the reference point and the target object, the position of the antenna structure 330 can be determined clearly and accurately ($x_2, y_2, z_2$).

Furthermore, the camera, built-in or connected to the measuring apparatus, creates an image of the target object and the antenna structures contained therein. The camera does not have to be directly connected to the measuring apparatus 310, but the images that may be taken from the position of the measuring apparatus can be transferred to the computing unit by means of radio communication or data card. The computing unit may in turn be directly integrated in the measuring apparatus 310, or be connected to it, or by other data transmission methods, such as wireless connection, data card, manual entry of similar, to receive the necessary information.

The orientation of the antenna structure is then determined by means of digital image processing, pattern recognition, image measurement, or similar technologies, in which the image of the measuring apparatus 310 is used as a basis. This calculation is done for example based on methods of three-dimensional conformal coordinate transformations, whereby the rotational parameters ($\omega_{x2}, \omega_{y2}, \omega_{z2}$) of the antenna structure can be determined. From this the absolute position and orientation of the antenna structure can be calculated.

The data necessary for the calculation programs are either running directly to the measuring apparatus 310, or on a computer connected to the measuring apparatus 380. In this case, the data transmission 362 can be firmly connected to the computer 380, or also take place via radio interface, data cards or similar.

The determined position and orientation are automatically, together with the position of the antenna structure via electronic data processing methods 361, 363 stored on a data disk 360. This can be data storage integrated into the measuring apparatus as well as online databases, web server, etc. The data transmission 363 can thus be integrated in the measuring apparatus 310, or it can be performed by means of wired or wireless technologies.

The thus collected, computed and stored data can subsequently, via electronic file transfer methods 371, which could be executed on both wired as well as on radio interfaces, be managed and presented in another software application and/or be stored or processed in another hardware device 370. For example, the data can be displayed in the application "Google Earth" on actual maps and checked for plausibility. Another example would be the direct integration into software applications for infrastructure inventory, databases of planning software applications, etc.

By one of the embodiments the position and orientation on the basis of measurements that are determined by a reference point (measurement point), whose position can be determined automatically, whereas the absolute position and orientation can be determined by means of range measurements and electronic image processing from the reference point to each of the antenna.

Furthermore, the determined data of the position and orientation of the antenna structure, may be transmitted via an interface directly into a database (eg online database, Web server, or in the databases of commercially available software programs for planning and optimization of mobile networks), whereas an absolute geo-referencing (eg GPS data, WGS 84, etc.) is provided.

It is known according to the state of the art that the position can be measured by means of GPS. Furthermore, methods are known that allow an automatic spatial orientation of a plane and setting a coordinate system in the respective dimension by means of rotation, elevation and torsion (gyro sensors, for example in mobile phones). Furthermore, methods are known that enable automatic calibration of position and orientation of a measuring device at a measuring point.

According to the state of the art it is known that measurements of a distance by using high accuracy laser technology are possible. An example of a known state of the art method and apparatus for measuring the distance and angle of a target object is the "Laser Type FG 21-LR" from Riegl Laser Measurement Systems GmbH (see data sheet for laser type FG 21, freely available on www.riegl.com). In this case, pulsed laser signals are emitted by the apparatus. Based on the run time of the signal reflected from the target object, which is received by the device, the distance is determined. Via built-in tilt angle measuring instruments the inclination relative to the horizontal plane can be automatically determined. Thus, the distance and height of a target object can be determined. Such a device can also be used for determining the distance and height of an antenna in accordance with the present invention.

A number of methods are known for measurement that are based on the distance measurement and which may also be used for the present invention. For example, the following methods are suitable to determine range data:

Fujima, S. Iwasaki and K. Seta, 'High-Resolution Distance Meter using Optical Intensity Modulation at 28 GHz', Meas. Sci. Tech., PP. 1049-1052 (1998).

G. Bazin and B. Journet, 'A New Laser Range-Finder Based on FMCW-Like Method', IEEE. Ins. Measu. Tech. Conference, Belgium, June 4-6, PP. 90-93 (1996).

Amann et al, 'Laser ranging: a critical review of usual techniques for distance measurement', Optical Engineering, Vol. 40 No. 1, January 2001, PP. 10-19 (2001); Society of Photo-Optical Instrumentation Engineers.

K. Maatta, 'Profiling of hot surfaces by pulsed time of flight laser range finder techniques', Applied Optics, Vol. 32, No. 27, 1993, PP. 5334-5342.

Ari. Kilpela, 'Pulsed Time-of-Flight Laser Range Finder Techniques for Fast, High Precision Measurement Applications', OULU, Section 2.2.2, "TOF method", 2004. http://herkules.oulu.fi/isbn9514272625/isbn9514272625.pdf.

Ki-Nam Joo, Yunseok Kim, and Seung-Woo Kim, "Distance measurements by combined method based on a femtosecond pulse laser," Opt. Express 16, 19799-19806 (2008), http://www.opticsinfobase.org/abstract.cfm?URI=oe-16-24-19799.

Lasers are used for distance measurement, for example, based on the time-to-flight method. For that, a short optical pulse is emitted from an apparatus. This is reflected by the target object and the time which elapses until the reception of the reflected signal is measured. From this, the distance is determined.

Another method for determining the distance is the phase shift method. Here, a laser signal modulated with a sinusoidal signal is transmitted from the transmitter. The reflected light is compared at the receiver with the transmitted signal, wherein the phase shift is directly proportional to the time shift and thus the distance traveled.

In addition there are a number of other methods, for example, where frequency-modulated laser signals and improved combined technologies are used.

According to the invention the recorded image of the antenna is analyzed to determine its orientation. Known methods from photogrammetry, pattern recognition and image measurement calculation methods can be used, which can determine the rotation, displacement, and scaling of image coordinates of the picture or photo from a specific object point in an image.

One example is the determination of the transformation of a coordinate system (x, y, z) to another coordinate system (X, Y, Z), the coordinate systems are rotated to each other. These universal methods for three-dimensional conformal transformations are described in detail in the following references, among others:

W. Niemeier, "Ausgleichsrechnung—Statistische Auswertemethoden", 2. Auflage, Abschnitt 10.2, 'Modelle für Koordinatentransformationen', page 343 ff, De Gruyten—Lehrbuch, Berlin/NewYork 2008, ISBN: 978-3-11-019055-7, Ghilani, C. D. and Wolf, P. R. (2007) "Coordinate Transformations, in Adjustment Computations Spatial Data Analysis", Section 18.7 (Three Dimensional Conformal Coordinate Transformation), Seite 380ff, Fourth Edition, John Wiley & Sons, Inc., Hoboken, N.J., USA. doi: 10.1002/9780470121498.ch18.

Figure 1:
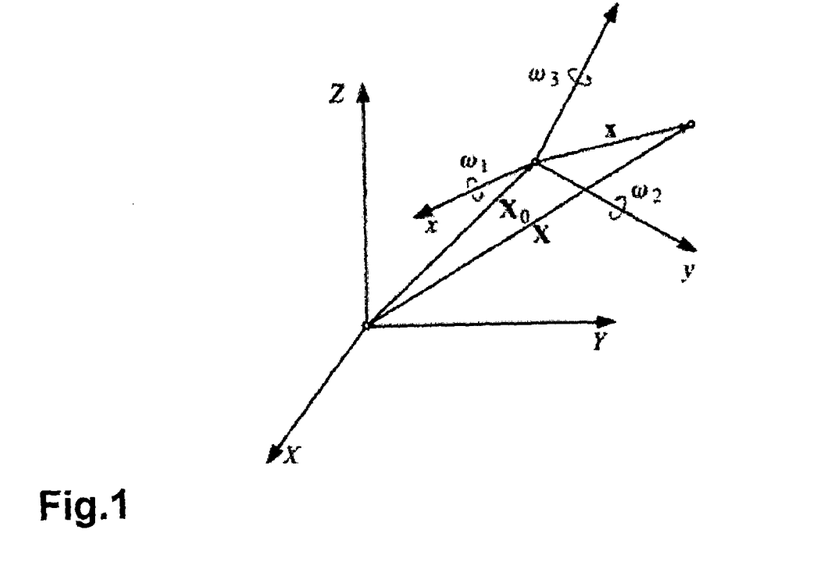
FIG. 1 shows a coordinate transformation

FIG. 1 shows the basic approach how such a method is used in accordance with the invention. In this specific example, the antenna is located in a three-dimensional rectangular coordinate system (x, y, z). The measurement point, and thus the reference point at the origin of the measurement is within the coordinate system (X, Y, Z). The reference point in the coordinate system (x, y, z), which is characterized by X0, may be, for example a corner of the antenna at which the distance from the measurement point and the reference point is determined from the measuring apparatus.

Both coordinate systems are shifted to each other $(X_0, Y_0, Z_0)$, twisted $(\omega_1, \omega_2, \omega_3)$ and are available via a scale factor m in relation to each other. The angles $\omega_1, \omega_2, \omega_3$ thus provide the rotation of the antenna based on the measurement point. The following applies:

$$\begin{bmatrix} X \\ Y \\ Z \end{bmatrix} = \begin{bmatrix} X_0 \\ Y_0 \\ Z_0 \end{bmatrix} + m \cdot R(\omega_1, \omega_2, \omega_3) \begin{bmatrix} x \\ y \\ z \end{bmatrix},$$

whereas the rotation matrix can be decomposed into:

$$R(\omega_1, \omega_2, \omega_3) = R_1(\omega_1) \cdot R_2(\omega_2) \cdot R_3(\omega_3)$$

with $$R_1(\omega_1) = \begin{bmatrix} 1 & 0 & 0 \\ 0 & \cos\omega_1 & \sin\omega_1 \\ 0 & -\sin\omega_1 & \cos\omega_1 \end{bmatrix}$$

$$R_2(\omega_2) = \begin{bmatrix} \cos\omega_2 & 0 & -\sin\omega_2 \\ 0 & 1 & 0 \\ \sin\omega_2 & 0 & \cos\omega_2 \end{bmatrix}$$

$$R_3(\omega_3) = \begin{bmatrix} \cos\omega_3 & \sin\omega_3 & 0 \\ -\sin\omega_3 & \cos\omega_3 & 0 \\ 0 & 0 & 1 \end{bmatrix}$$

From this context, the determination of the dimensions of the image, the knowledge about the actual dimensions of the antenna, and a minimum number of measurement points for the solution of the equation system, the rotation matrix can be determined (see the above references). From this, the rotation angle of the antenna based on the reference of the measurement point can be calculated. The position $X_0, Y_0, Z_0$ corresponds to the measured absolute position of the antenna, which may be defined, for example as a corner point of the antenna structure.

The methods mentioned above are only an example of determining the twisted angles of the antenna. Other methods are possible.

The dimensions of the antennas are typically known. This data will be provided by the manufacturer of the antennas in the data sheets and published, such as in the case of manufacturer Kathrein "Kathrein Scala antennas, '742215-65° Panel Antenna', Data Sheet, available free on www.kathreinscala.com".

Exemplary Embodiment of an Integrated Measuring Apparatus

In the following an embodiment is described where the calculation of the resulting data is carried out directly in the measuring apparatus:

The user installs the measuring device of the invention on a support fitting (eg tripod) and switches it on. Automatically the position of the measuring device is determined by means of a built-in GPS receiver or other method. For example, the measurement point may be registered on a geo-referenced map and thus determines the coordinates. The determined position can be shown on a graphical user interface. A software application guides the user step by step through the measurement process.

First, the measuring apparatus needs to be aligned in the direction of the measurement object. This happens manually by the user by either a dedicated viewfinder and a corresponding target optics, similar to a telescope or a digital SLR, for example by a marker or a cross, or the display is not through a viewfinder but directly on a screen similar to the screen display of a compact digital camera that does not have a viewfinder.

The user can target one or more points of the antenna as reference measurement points. This reference measurement points determine the absolute position of the antenna. Also, several points may be defined and a center point can be determined based on them. The points may optionally be labeled directly so that the measurement analysis automatically detects the image. Furthermore, an adjustable window can be defined that surrounds the antenna. This may be detected automatically with appropriate image processing that detects the frame structure of the antenna and the associated vertices.

A further possibility is that a recognition framework based on gradient pattern recognition, so that the antenna can be automatically determined based on an inhomogeneous transition from the antenna to the environment, such as "gray" antenna on the "blue" of the sky in the background. By selecting a reference point within the antenna structure, which is also featured in the later image acquisition can be defined as the reference color, and thus the frame detection, including detection of the vertices can be automated. Other image processing techniques may be used in addition to or independently, for example, edge detection, and object detection methods that make use of characteristic points (predefined characteristics). Examples of such techniques are well known as per state of the art, for example, R. Jain et al., "Machine Vision", McGraw-Hill, Inc., ISBN 0-07-032018-7, 1995 (see especially chapter 15 for object recognition, chapter 5 for edge detection, and chapter 3 for image segmentation).

In summary, the present invention detects the three-dimensional structure from the digital image (for example, geometric shape, color, etc.) of the antenna by means of the known image processing methods and/or with the assistance of the user who may indicate predetermined characteristics of the antenna in the digital image.

Once the target is detected, the distance measurement is performed. First the orientation data is collected, ie orientation (azimuth, tilt and torsion) of the measuring device in the direction of the measurement object. Then, by means of distance measurement (eg long distance range meter with a range of 100 m, 300 m up to 1 km—depending on the version) the distance to the reference point, eg at a lower corner on the measurement object is measured.

The position of the object is uniquely determined based on the reference values of the position of the measuring device and the measurement values.

By determining a reference point on the measurement object, for example by a reticle on the target optics or on the display, a reference point for image is set. The image of the object is created and stored with the highest possible resolution.

The user has the option to control and enlarge the image via touch-sensitive display before it is stored. A contour detection software (computer vision) calculates the contours of the antenna structure and defined measurement points on the structure, wherein the user can also manually define some characteristics (for example, contrast adjustment, number and position of the measuring points). By that reference points such as corners can be set as well.

Antenna structures of the type described by the manufacturer of the antennas are well documented and published, and are therefore known to the mobile operator and/or user. Because of the structural knowledge about the antenna shape (rectangular systems and known edge length, etc), the angle relations in the image of the reference position, the orientation of the measurement apparatus and the distance measurement, the orientation of the coordinate system—in which the antenna is located—and thus the orientation of the antenna, can be calculated using methods of conformal coordinate transformation. The so calculated tilt angles can be displayed.

The storage of the collected data is the next step. To do so, the antenna must have an identifier, e.g. a name can be assigned. This can be done manually, or it can automatically be assigned a unique name. Ideally, existing reference data may be read directly, for example, from an inventory database, a planning tool or the like. By that the name of the antenna, the type, manufacturer data, etc. would be readable and well known. According to this data, the required dimensions of the antenna can be determined.

In a particularly advantageous embodiment, the antenna models could also be detected directly using image recognition and an antenna type database. For this purpose, the antenna is detected in the captured image of the antenna. The user can provide manual identification by the outer contour of the antenna sub-data or the edges and corners of the antenna can be automatically detected. The identified antenna and/or their proportions are then correlated with the antennas in the antenna database, and thereby the type of the antenna can be determined.

Furthermore, by automated user guidance in the display of the device, the calculated values can be used, transmitted and stored into a database (local or web server, or other external storage device). The user has furthermore the possibility of including additional details to be stored in the database, in addition to the picture of the antenna.

For rapid data transfer, the measuring apparatus and a wireless module may therefore be included, through that the data is transmitted online and stored in a registered server.

In an advantageous embodiment the measuring apparatus has, according to the above example, a graphical user interface that can be operated via a touch-sensitive screen. However, the invention can also be equipped with a simple display and the control can be configured using a key or keyboard and/or other controls.

Embodiment Whereas the Calculation is Performed Outside the Measuring Apparatus

In the following embodiment the case is described in which the calculation of the position and orientation data is carried out outside of the actual measurement apparatus:

The user uses the measuring device and turns it on. The measuring device has a manageable form factor and is handled freely by the user, such as a pair of binoculars. The user sets the measurement device in the direction of the target, wherein the target is identified by an appropriate optics, a viewfinder integral with a graticule or the like.

Once the user targets the target object, the measurement is performed by means of shutter release. At that point the user's position is determined by means of integrated or connected location determination capabilities. Furthermore, the difference in elevation between the user and the target object are determined by means of integrated or connected inclination measurement, and detected by an integrated or attached compass azimuth in the direction of measurement. In addition, the rotation with respect to the vertical axis is detected by level gauge. Furthermore, the distance between the user and the target object is measured.

In a particularly advantageous embodiment, all of these measurements are done at the same time, by pressing the shutter button, or at slightly shifted—not recognizable different times.

In addition, an image of the target object, i.e. the antenna, is generated wherein the user can adjust the magnification of the aerial image shown in the viewfinder. This can be done for example by an additional actuator mechanism allows enlarging or reducing the picture, comparable to the mechanism at a compact digital camera.

The data thus obtained is transmitted by means of electronic data transmission (wired, via a data card, wireless transmission or similar) to a computer (laptop, tablet, other device). On the laptop (tablet, etc) run the software applications necessary to calculate the absolute position and orientation of the target inventive antenna.

The software applications now allow the user to enlarge the image to run contour detection software to define measurement points and to influence the calculation of properties manually.

The calculated position and angle of the antennas can be displayed on the computer screen and processed further.

Storing and further processing of the data can take place as in the above-mentioned example.

Embodiment of the Calculation on a Computer with External Modules

Another example for the implementation for the calculation of the orientation considers the processing happening on a calculator or computer 380, whereby the position of the antenna 330 is determined by means of distance and height measurement 320, respectively. The data necessary for the orientation (azimuth and rotation with respect to the horizontal plane) can also be determined manually for example read from compass and level meter 392. The required position measurement can also be done via an external position measuring device, eg GPS receiver 391. All of these measurements should be carried out at the position of the distance measurement 310.

The image can also be taken manually using a standard camera 393, where the position of the device—for taking the measurement of the distance—and the position for taken the image should be identical or at least very similar. The aligned data is arising automatically because the target object and the data for the distance measurement are the same. Therefore, the images can also be sent manually to the computer (eg memory card of a digital camera) and stored there. The data (position, orientation of antenna, distance, image) must be combined manually thereafter, which can be done in a software application on the computer 380 through appropriate instructions.

Further calculations, processing and storage of the data are performed by software applications according to the above embodiment.

In an advantageous embodiment the measuring apparatus comprises a device for automatically determining the position, such as a GPS receiver which determines the position automatically.

In an advantageous embodiment of the measuring apparatus it comprises a device for the automatic detection of the orientation (azimuth, tilt, rotation) of the measuring apparatus with respect to an absolute reference coordinate system (horizontal plane, vertical plane normal upright to the horizontal plane, geographical north).

In a further advantageous embodiment, the calibration of the measuring apparatus 310 is (eg on a control button or a touch-sensitive display, etc.) automatically performed by pushing a button.

Preferably, the measurement apparatus has a distance measuring device which can be controlled via a software program or the data can be read electronically.

The measuring apparatus may include a device for taking a digital image of the target object (the antenna).

In an advantageous embodiment, the measurement device has an integrated camera that can create high-resolution images of the target object and the user can affect the magnification.

The measuring apparatus preferably includes possibilities for the exchange of electronic data, processing and storing the measurement data.

In a particularly advantageous embodiment, the data can be transmitted from the measuring device via a radio interface to a computer to be further stored and/or processed there.

Furthermore, the interface 371 may represent an interface to existing radio network planning tools and optimization tools available on the market, which would then run each on a computer (370).

In a particularly advantageous embodiment, the properties (size of the antennas, dimensions, etc.) and names of the antennas can be allocated to antenna sectors stored in a database, such as sector/antenna data imported from a radio network planning tool before the measurement, so that the data can be mapped to existing data sets.

In a particularly advantageous embodiment, the imported data from a database can be compared and aligned with the measured data, and reports on deviations can be created. For example, the user can review the quality of the data available in the database. The "nominal" values are read according to the database, and compared with the measured "as is" values. The "reference" values herein, for example, values that have been calculated by a network optimization method, or determined by the network operator. The "actual" values can then, for example, be the measured values. Major advantages are that no more manual data entries on basic antenna and transmitter designations must be made and a rapid and efficient method for checking the antenna data is created, and that the data can be matched directly with the database.

In a particularly advantageous embodiment, the measurement results of the target object can be combined with multiple different measurement points and reference points and thus jointly evaluated. Significant advantages arise from the calculation of the three-dimensional properties to improve the accuracy of the measurement, an improved precision or resolution, as well as the possibility to compute other 3D properties. Because multiple measurement points and digital images from different viewing angles can be done, 3D projections of the antennas can be created. Calculation methods for the computation of 3D projections from 2D images can be found for example in: I. Stamos and P K Allen. Automatic registration of 2-D with 3-D imagery in urban environments. In ICCV, pages 731-737, 2001.

These 3D models may be stored in a database so that the user can view the antenna alignment from different points at a later time. This is of particular advantage, because an engineer can then get the best possible impression of the overall situation.

Figure 4:
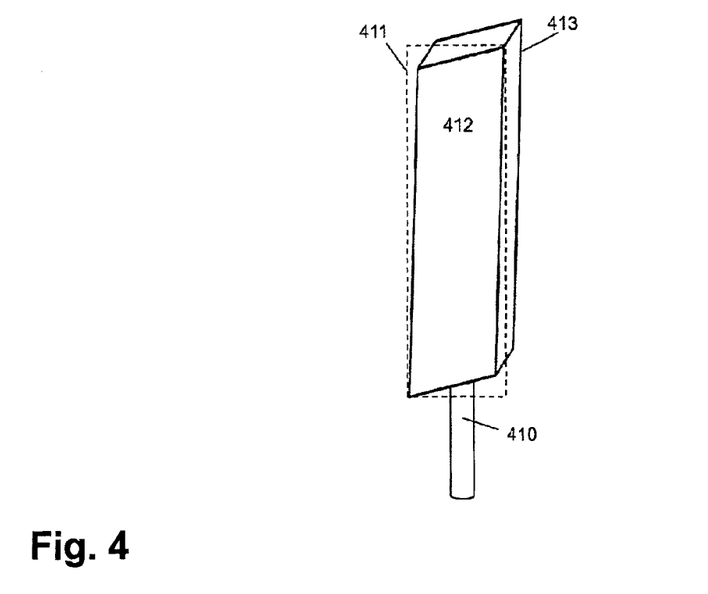

FIG. 4 shows an example of the determination of the orientation of the antenna structure 412, which is mounted on the mast 410. It is known how the antenna structure looks like in the frontal view, resulting in a rectangular structure 411 Furthermore, the dimensions of the antenna are well known based on the information about the antenna model. Due to the actual size, the orientation and the relative viewing angle from the measurement point to the antenna structure, a resulting distortion of the contour as in 413 is shown. From this distorted shape, a number of measuring points defined, the position of the reference measurement point, the orientation of the measuring apparatus, and the distance to the target, the orientation of the antenna, and the rotation of the coordinate system in which the antenna is located—relative to the coordinate system of the observer, can now be determined. This happens, for example by means of three-dimensional conformal coordinate transformations. This in turn results in the angles determining the orientation of the antenna.

Figure 5:
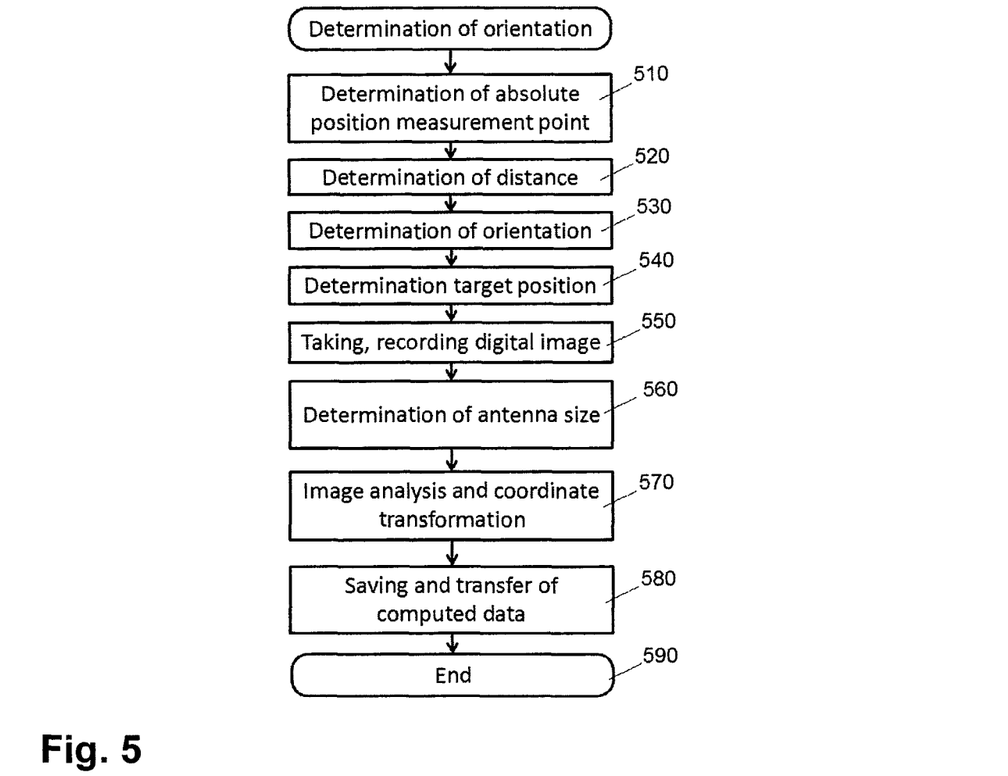

FIG. 5 shows an example of a flow for the method for calculating the orientation. Determining the absolute position of the measurement point 510 is followed by the determination of the distance to the target object 520. Determining the position of the measurement point 510 can be done by means of GPS or other location capability.

For example, the position can be entered manually, or a measuring point with known coordinates can be selected. For distance measurement, there are also a number of implementation options, for example, optical (eg laser) and microwave-based methods. After the determination of the orientation 530 from the measurement point to the target object and the results from the distance measurement 520, as well as the determination of the absolute position of the measurements point 510, the absolute position of the target object 540, respectively a reference point at the target object, e.g. a marked or automatically set corner point, can be determined. The processes 510-540 may be performed manually, or also done automatically by pressing a button on a device. The advantages of the procedure are the common and easy handling necessary for this compact design of the device.

Furthermore, a digital image 550 of the target object is captured and processed. Determining the size of the antenna 560 can be done from a database, entered manually by the user or can be automatically performed on the basis of pattern recognition and comparison with a database based on optical criteria of the antenna. It is essential that the actual physical size of the antenna structure is supplied as a result.

By using this existing information the image analysis and associated coordinate transformation 570 can thus be started. Based on the combination of the target position 540 and the image analysis 570, the absolute position of the antenna, as well as its three-dimensional orientation can thus be determined.

After the data is saved to a storage medium 580, which may be a local data storage in the simplest case, a synchronization with on-line databases on the Internet, and specialized software application for comparison of stored and measured data. The latter allows, for example, a statistical analysis of the accuracy and quality of the data quality in the existing database.

Finally, the analysis ends 590. The process in FIG. 5 is only one possible embodiment of the invention. The sequence of steps can also be different. For example, the particular steps 510-560 can be executed in any order, because the measured values are needed only in step 570 to calculate the antenna orientation.

In summary, the determination of the position and orientation of base station antennas in the mobile phone systems is of great significance for optimizing the transmission parameters. It requires time-consuming and costly effort, since it must be measured directly at the antenna. Moreover, the access to the antenna is often not possible. This has a very negative effect on the accuracy of the data, so that the optimization results in which antenna parameters are changed greatly suffer. With the new method and the device presented, the rapid, accurate and cost-effective detection of the position and orientation of the transmitting antenna is possible without the need to measure in the vicinity of the antenna. The new method allows the determination of the absolute position of the base station antenna and to determine their orientation even from greater distances away from the antenna. Thereby, the coordinates of the reference point (measurement point), distance measurement to the target antenna, measurement of the inclination angle and the orientation of the measuring apparatus determining the absolute position of the antenna are determined by automatic means. The orientation of the to be measured base station antenna is determined by means of photogrammetric measurement methods, the knowledge about the absolute dimension of the antenna, as well as mathematical methods such as the conformal transformation on the image taken. Applications include the rapid, cost effective and high quality determination of the position and orientation of antenna structures.

What is claimed is:

1. A method for determining the orientation of an antenna, comprising:
   recording a digital image of an antenna with a camera at a measuring point,
   determining the relative position of the measuring point with respect to the antenna,
   determining the size of the antenna, and
   calculating the orientation of the antenna based on characteristics of the recorded digital image, the determined relative position and the size of the antenna.

2. The method according to claim 1, wherein:
   the determination of the relative position comprises a measurement of the position of the measuring point, and a measurement of the distance between the measuring point and/or a measurement of the direction in which the distance was measured,
   the determination of the size of the antenna comprises extraction of technical specifications of the antenna from a database based on the digital image of the antenna and/or the position of the antenna and/or a user input.

3. The method according to claim 1, wherein determining the relative position comprises:
   aligning of a device for distance measurement with a display for displaying a target object so that the antenna is displayed on the display, wherein the alignment is performed by a user,
   measuring the orientation of the device and the distance between the device and the antenna,
   selecting predefined locations on the antenna by the user on the display or in the digital image, whereas
   a calculation of the orientation of the antenna is based on the predefined locations and the measured distance and orientation of the device.

4. The method according to claim 1, wherein the characteristics of the digital image are predetermined locations of the digital image of the antenna, and the calculation of the orientation of the antenna is done by a coordinate transformation.

5. The method according to claim 1, further comprising the storage of the calculated orientation of the antenna and/or a captured image to a database.

6. A device for determining alignment of an antenna, comprising:
   a camera; and
   an alignment processing unit for determining alignment of an antenna based on characteristics of a digital image recorded at a measuring point with said camera of said antenna, the relative position of a measurement location with respect to the antenna and the size of the antenna.

7. The device of claim 6, further comprising:
   a device for distance measurement with a display for displaying a target object so that the antenna is displayed on the display, wherein the device can be aligned by a user in the measuring point and adapted to determine the orientation and the distance to be measured between the point of measurement and the antenna.

8. The device according to claim 6, further comprising a GPS receiver for determining the position of the measurement location or a connector for connecting the GPS receiver.

9. The device according to claim 6, wherein the characteristics of the digital image are predetermined locations recorded in the picture of the antenna and the orientation of the image processing unit is adapted to perform a calculation of the orientation of the antenna by a coordinate transformation.

10. A method for determining a position and orientation of an antenna comprising the steps of:
    storing structural knowledge about the antenna on a storage device;
    determining an absolute position of a measuring apparatus;
    detecting the antenna with the measuring apparatus;
    recording an image of the antenna with a camera from the absolute position of the measuring apparatus;
    determining a distance to the antenna from the absolute position of the measuring apparatus;
    selecting a plurality of reference points on the antenna;
    retrieving the structural knowledge about the antenna from the storage device;
    calculating an orientation of the antenna based on the absolute position of the measuring apparatus, the distance to the antenna, the image of the antenna, the plurality of reference points, and the structural knowledge about the antenna from the storage device,
    storing information representative of the orientation of the antenna; and
    transmitting the information representative of the orientation of the antenna to a database;
    whereby the position and orientation of the antenna is accurately determined and planning and optimization of networks using the antenna is improved.

11. The method for determining a position and orientation of an antenna as in claim 10 comprising the further step of:
    performing a coordinate transformation between a location of the antenna and a location of the measuring apparatus.

* * * * *